L. O. DEMERS.
PISTON RING CLAMP.
APPLICATION FILED JUNE 11, 1914.
1,113,106.
Patented Oct. 6, 1914.
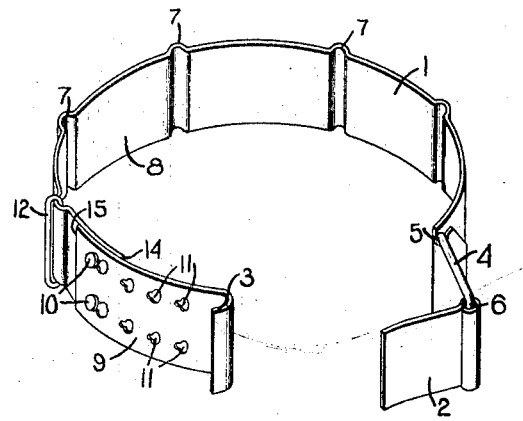
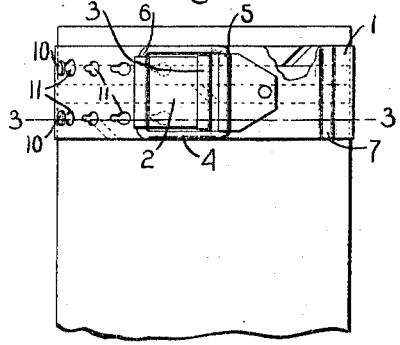
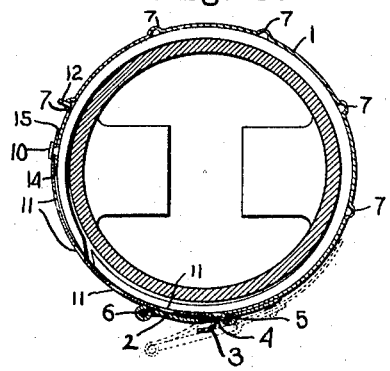
Witnesses.
J. Morrill Fuller
William C. Gagen
Inventor.
Louis O. Demers
by Heard Smith & Tennant
Att'y's

UNITED STATES PATENT OFFICE.

LOUIS O. DEMERS, OF BOSTON, MASSACHUSETTS.

PISTON-RING CLAMP.

1,113,106.  Specification of Letters Patent.  Patented Oct. 6, 1914.

Application filed June 11, 1914. Serial No. 844,567.

*To all whom it may concern:*

Be it known that I, LOUIS O. DEMERS, subject of the King of Great Britain, residing at Boston, county of Suffolk, State of Massachusetts, have invented an Improvement in Piston-Ring Clamps, of which the following description, in connection with the accompanying drawing, is a specification, like characters on the drawing representing like parts.

Pistons of steam and gas engines, pumps and the like are almost universally fitted with expansible piston rings to provide a tight joint between the piston and the cylinder walls. When inserting the piston in the cylinder either when first assembling or after cleaning or repairing it is necessary to compress the rings into the piston and hold them in such position until inserted into the cylinder, a clamp usually being employed for this purpose. The piston is frequently removed and repaired without removing the engine or pump from its mounting so that it frequently becomes necessary to insert the piston in positions difficult of access. This is particularly true in repairing automobile engines. In such cases it is frequently particularly difficult to remove the clamp of usual construction from the piston after the piston has been inserted to such an extent that the rings are entirely within the cylinder and the clamp has performed its function.

Accordingly this invention has for an object to provide an improved clamp which may be easily removed from the cylinder after it has served its purpose.

Another object is to provide a clamp which may be adjusted to fit cylinders of different sizes.

The nature and objects of the invention will more fully appear from the following specification and accompanying drawings and the novel features will be particularly pointed out in the claims.

In the drawing: Figure 1 is a perspective view of a clamp constructed in accordance with my invention; Fig. 2 is a view in elevation showing the clamp applied to the piston, and Fig. 3 is a sectional view taken on the line 3—3 Fig. 2, the position of the parts during the process of applying the band being indicated in dotted lines.

My invention provides a clamp which engages the piston rings and holds them temporarily contracted. In the preferred form the clamp comprises a band to embrace the piston and piston rings and a compression member connected to one end of the band and arranged to coöperate with the other end thereto to secure the ends together.

In the drawing I have illustrated a clamping ring comprising a band 1, constructed of brass or other suitable material and a compression member 2 pivotally connected to one end thereof. The opposite end of the band is formed to engage and coöperate with the free end of the compression member. For this purpose the band may conveniently be formed to present a hook 3. The engagement of the free end of the compression member with the hook is such that when the compression member is moved to releasing position it is entirely disengaged from the hook, permitting the clamp to drop from the piston.

The compression member in the construction illustrated is not connected directly to the end of the band but a link 4 intervenes, one end of the link being pivoted to the band as indicated at 5 and the other end being pivoted to the compression member as indicated at 6. This link is preferably somewhat longer than the compression member and so shaped and so connected at its ends that when the clamp is placed around the cylinder with the free end of the compression member engaging the hook and the connected ends of the compression member and link are moved toward the cylinder and against the band, the parts taking the position shown in full lines in Fig. 2, the point of engagement of the end of the compression member 2 and the hook 3 will lie inside a straight line connecting the pivots 5, 6. I prefer this construction of link and compression member in which the link is longer and so constructed that in locking and unlocking the parts the links are swung radially toward and from the cylinder for the reason that this construction is easily manufactured and may be conveniently operated. It is obvious, however that the links may be connected in other ways while retaining the same principle of operation. It will be noted that the construction of the hook and compression member is such that when released the compression member will be entirely freed from the hook thus entirely disconnecting the ends of the band so that it may drop off from the piston or may be readily removed therefrom without the necessity for further manipulation in order to disengage the ends. This feature is of particular advantage when working in a confined space.

To apply the clamp to a piston and compress the piston rings the band is placed around the rings and the free end of the compression member 2 is inserted in the hook 3. The pivoted end of the compression member is then swung inwardly against the band to the position shown in Fig. 3 in full lines. During this movement the parts operate somewhat in the manner of a toggle mechanism to apply tension to the band and compress the piston rings, the compression member and link being moved into alinement and then slightly farther to a locking position. When in this position the compression member and link are substantially in alinement with the ends of the band.

The band may be provided with projections to engage the end of the cylinder and prevent the clamp entering the cylinder as the piston is inserted into. This is conveniently done by bending the band at intervals to form projections 7, and these projections are sufficient to engage the cylinder and thus hold the clamp to prevent it from entering the cylinder while the piston is pushed through the clamp into the cylinder.

In order that the clamp may be used for pistons of various sizes, I provide means for adjusting the length of the band. In the construction shown this is accomplished by making the band in two sections 8, 9. The section 8 is provided with a pair of projecting pins, or lugs 10, having relatively large heads and small shanks and the section 9 is provided with pairs of correspondingly spaced holes 11 of key-hole shape. The spacing of these holes longitudinally of the band is such that when the lugs are inserted in different holes the band will correspond in size to the several sizes of cylinder with which the clamp is to be used. I prefer to provide a guard 12 so positioned that when the lugs 10 are inserted in the holes spaced from the end 14 of the section 8, the end 15 of the section 9 may be inserted in the guard to be held close against the section 8 of the band.

By this invention, I provide a piston ring clamp which when applied, provides the necessary leverage to easily compress the rings into the piston thus making the clamp serve the function of compressing the piston rings and which may be removed by a simple operation which entirely frees the clamp from the piston.

Having described my invention, what I claim as new and desire to secure by Letters Patent is:

1. A piston ring clamp comprising a band formed at one end to present a hook, a link pivotally connected to the opposite end of the band, and adapted to extend beyond the hook when the clamp is closed, and a compression or strut member pivoted to the outer end of said link and engageable at its free end with said hook, whereby when the compression member is moved to locking position, the clamping ring is contracted.

2. A piston ring clamp comprising a band formed at one end to present a hook, a link pivotally connected to the other end of the band, and a compression member shorter than said link pivoted thereto, and engageable at its free end with said hook the parts being so constructed and arranged that the free end of the compression member may be engaged with the hook and the connected ends of the compression member and link moved to bring the link and compression member substantially into alinement to contract the clamping ring.

3. A piston ring clamp comprising a band formed at one end to present a hook and provided between its ends with projections to engage the end of the cylinder to prevent the band entering the cylinder, a compression member pivotally connected to the opposite end of the band and arranged to engage said hook and operating when moved into alinement with the ends of the band to contract the clamp.

4. A piston ring clamp comprising a band made in two sections adjustably connected together, one section being formed at its free end to present a hook, a link pivotally connected to the other end and a compression member shorter than said link pivoted to the outer end thereof and adapted to engage at its free end with said hook, the parts being so constructed and arranged that when the free end of the compression member is engaged with the hook the connected ends of the compression member and link may be moved to bring the link and compression member substantially into alinement thereby to contract the clamping member.

In testimony whereof, I have signed my name to this specification, in the presence of two subscribing witnesses.

LOUIS O. DEMERS.

Witnesses:
 MAURICE B. LANDERS,
 THOMAS J. DRUMMOND.